United States Patent
Dillner

[15] 3,693,985
[45] Sept. 26, 1972

[54] END FACE FLUID SEAL UNIT
[72] Inventor: Arthur M. Dillner, 14321 South Stewart, Riverdale, Ill. 60627
[22] Filed: May 12, 1971
[21] Appl. No.: 142,695

[52] U.S. Cl. .................. 277/29, 277/75, 277/89, 277/93 R, 415/111
[51] Int. Cl. .................. F16l 17/00, F04d 29/10
[58] Field of Search .......... 277/29, 75, 85, 86, 87, 88, 277/89, 90, 93, 95; 415/110, 111, 113

[56] References Cited

UNITED STATES PATENTS

| | | | |
|---|---|---|---|
| 2,491,233 | 12/1949 | Vedovell | 277/29 |
| 2,994,547 | 8/1961 | Dolhun et al. | 277/88 X |
| 3,031,199 | 4/1962 | Laser et al. | 277/93 X |
| 3,269,738 | 8/1966 | Bäumler et al. | 277/88 X |
| 3,391,939 | 7/1968 | Mueller | 277/90 X |
| 3,469,851 | 9/1969 | Enemark | 277/85 |

*Primary Examiner*—William F. O'Dea
*Assistant Examiner*—P. D. Ferguson
*Attorney*—Greist, Lockwood, Greenawalt & Dewey

[57] ABSTRACT

A seal for use between first and second relatively movable elements to retain fluids within a predetermined area of elevated pressure in a pump or other application. The seal is of the end face type and includes a primary sealing element, means for urging the primary sealing element against a cooperating mating surface to provide a primary seal, single means for transmitting torque from the first element to the sealing ring and for applying a desired axial load to the sealing element, means for preventing the pressure within the elevated pressure area from acting significantly upon the single means to increase the axial load on the sealing element and a secondary seal to prevent leakage of the fluid to be sealed to an area of reduced pressure by flow between the first element and the primary sealing element. The seal unit provides a number of advantages over similar seal units, including the ability to seal effectively in relatively high pressure environments, while retaining most or all of the advantages of similar prior art seals. The seal assembly is capable of use in a variety of applications, including seals for pumps used in appliances, automotive applications, and elsewhere.

14 Claims, 3 Drawing Figures

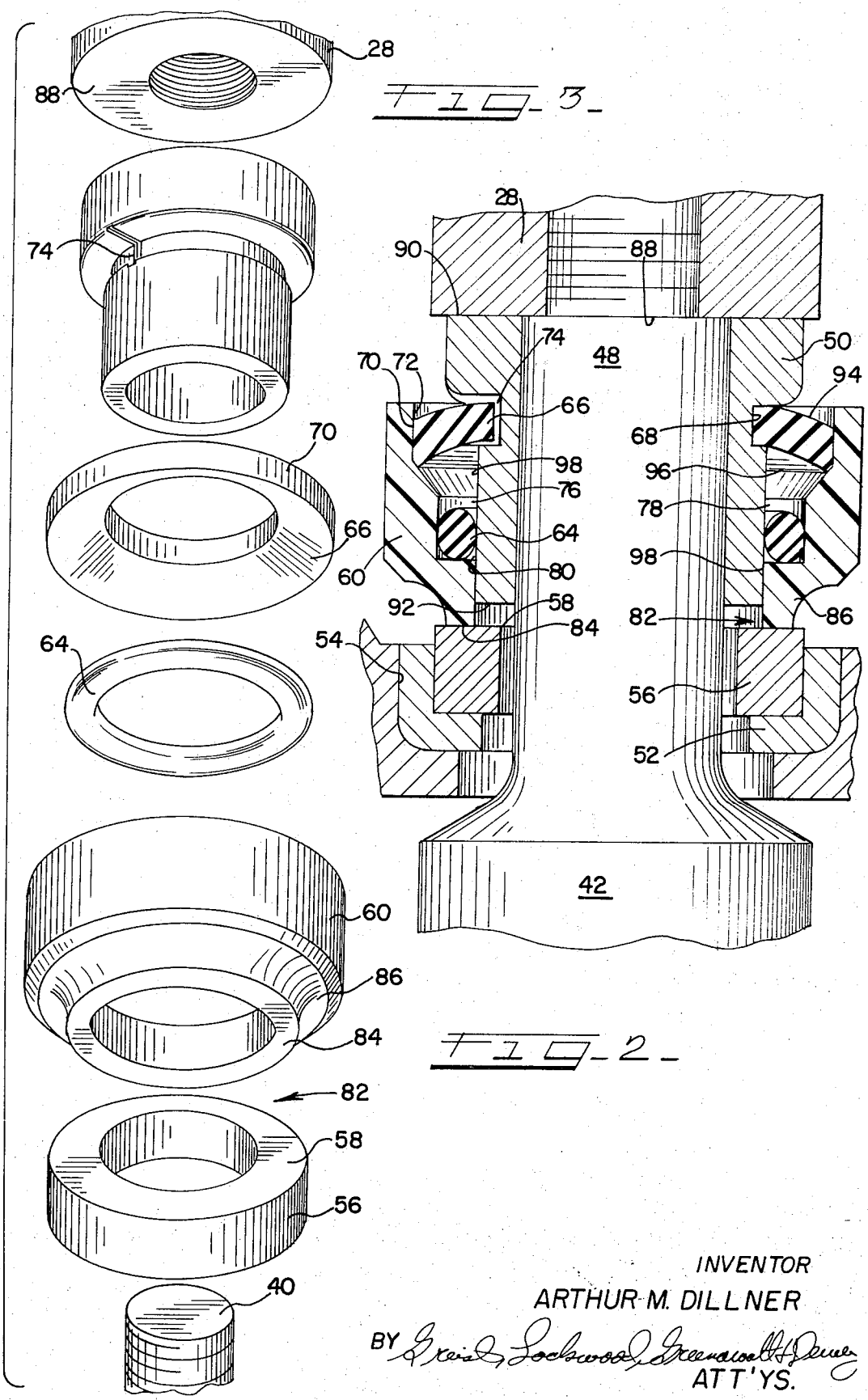

END FACE FLUID SEAL UNIT

BACKGROUND OF THE INVENTION

The present invention relates generally to fluid seals, and more particularly to fluid seals of the so-called end face type. In such a seal, the primary sealing forces are generated axially against a sealing ring to urge it into sliding, primary sealing engagement with a mating ring with the sealing and mating rings being movable relative to each other. The seal band or primary seal area is thus a radially extending, axially facing annulus. Seals of this general type are capable of a wide variety of applications, but are commonly embodied in water pumps used in automotive vehicles and the like, and are also commonly used as water pump seals in appliances as sump pump seals, and as seals for other fluid handling apparatus, for example.

In the past, a great deal of success has been obtained in certain environments with end face seals of the general type with which the invention is concerned, that is, seals in which a single element, usually a generally frusto-conical, unitary resilient member provides the plural functions of locating a primary sealing ring with respect to a shaft to which it is fixed, urging the ring axially into engagement with a stationary mating flange, transmitting torque between the shaft and the sealing ring, and providing a secondary seal, that is, a seal between the two elements which are fixed relative to each other and which are joined by the relatively stiff but somewhat resilient member. Seals of this type, while advantageous in many respects, have been characterized by one drawback which, in certain installations, creates problems, namely, the inability of such seals to be used in environments wherein there is a significant pressure differential across the seal.

Thus, for example, high pressure on one side of a frusto-conical or Belleville washer type seal having a significant radial extent either tends to distort the Belleville washer and cause leakage about its inner or outer periphery where it is joined to the sealing ring and shaft, respectively, or, the pressure serves to increase the axially directed or face loading forces on the sealing ring, or both. In one case, this commonly results in secondary seal leakage, while, in the other case, rapid seal wear, difficult starting, or undesirably high driving torque result.

Attempts to minimize or eliminate these problems by change in the design of the Belleville washer element have not been successful because this element must generally have a predetermined degree of flexibility, axial travel distance and radial load, and cannot be made so thick as to resist pressure induced forces nor so thin as to fail to provide the axial loading and torque transmission functions for which it was designed. As a result, seals of this general type have not commonly been able to be used successfully in high pressure environments, and more particularly, in environments of high pressure variation, wherein design criteria could reflect exact conditions to be encountered in use. For purposes of the present invention, the expression "high pressure" as used herein is entitled to encompass pressure ranges up to about 60 to 100 pounds per square inch (psi), for example.

In the past, end face seals subject to pressures of the order set forth above have ordinarily comprised an axially directed face member which is spring loaded by an axial coil spring, which is in turn surrounded by a metal diaphragm to afford pressure resistance, and a thin rubber boot to provide a liquid-tight seal. Such constructions are also characterized by a number of smaller parts such as auxiliary stampings and the like, and require adhesive as well as mechanical assembly during manufacture. Although seals of this type are in general commercially satisfactory, they are somewhat expensive, and would desirably be capable of demonstrating improved reliability. Normally, such seals fail in use by developing a "stick-slip" vibration which occurs upon start-up after relatively long idle periods. This vibration usually results in a chattering action, which occasions rapid wear, inasmuch as the mechanical fastening of the seal ring to the shaft is unable to accommodate chatter and intermittent or highly variable load forces. Furthermore, reliability problems are always inherently present with multipart assemblies, particularly those requiring both mechanical and adhesive assembly or preassembly.

Seals of the type just described, however, are advantageous in respect to certain other prior art seals, including the packings of the types which were formerly quite common with water pump seals and the like.

As is the case with many fluid seals, considered from a functional standpoint, the seal unit is normally one of the two basic parts of an associated fluid pump unit, and accordingly, failure of the seal is equivalent to failure of the pump unit, calling for repair or replacement of the pump. In a typical centrifugal pump of the type used in a washing machine or other home appliance, or in an automobile water pump, the functional parts of the construction includes merely the housing and a rotatable impeller secured to a shaft. Since the impeller is out of mechanical contact with other parts, it has a substantially indefinite wearing life in use, under normal circumstances. Aside from easily lubricated bearings or bushings which serve to position the shaft, the only other important functional part of such pumps is the seal. If the seal fails, although it is an inexpensive part ordinarily costing only 1 dollar or even much less, the labor cost in removing or exchanging the pump or replacing the seal effectively prices the cost of a seal failure at 10 to 20 or more times the actual cost of the seal itself.

Manufacturers are particularly concerned with seal reliability where the appliance or automobile is covered by an extended warranty, not only because of replacement costs, but because in some cases, pump failure may result in serious damage to the entire appliance or engine. Accordingly, an object of the present invention is to provide an improved fluid seal.

Another object is to provide a fluid end face seal for a pump or the like, particularly a seal characterized by a high degree of reliability in use.

Another object is to provide a seal which is capable of withstanding relatively high pressures and which may be operated under conditions of relatively constant, predetermined axial load substantially independent of the pressure or pressure variations within the assembly wherein the seal is used.

A further object is to provide an improved seal unit of the type having a relatively rotatable sealing element having a radially extending annular sealing face for engagement with an oppositely disposed mating ring, and wherein a stiff but resilient elastomeric element is provided for coupling the sealing element to an associated shaft or other part and for urging the sealing element axially against a mating ring.

Another object is to provide a seal construction having a generally frusto-conical elastomeric element of significant cross-section for urging a sealing element against an oppositely disposed, axially facing mating ring, a secondary seal means of reduced area to provide a high pressure seal between the sealing ring and a portion of the rotatable shaft or other element with which it is associated in use, and a vent to eliminate axial forces on the elastomeric element.

Another object is to provide a fluid seal for pumps and the like wherein a vent is provided to equalize fluid pressure on both sides of the element providing the axial end face load, while providing a secondary high pressure seal element of greatly reduced cross-section for disposition between the sealing element and the portion of the unit which rotates with the seal element, to prevent fluid leakage from an area of higher pressure to an adjacent area of reduced pressure.

These and other objects and advantages of the invention are accomplished, at least in part, by providing a seal unit for use between relatively movable parts and which includes a primary sealing element, means for coupling the sealing element to one of the relatively movable parts and for biasing the seal element axially into engagement with the radial face of a mating ring associated with the other part, means for equalizing the pressure on both sides of the biasing element, and means for providing a secondary seal between a part of the primary sealing ring and the part on which it is carried.

The manner in which these objects and advantages are typically carried into practice will become more apparent when reference is made to the following description of the preferred embodiments of the invention and to the accompanying drawings wherein like reference numerals indicate corresponding parts throughout.

BRIEF DESCRIPTION OF THE DRAWINGS

FIG. 2 is a greatly enlarged fragmentary view of the seal unit embodied in the construction of FIG. 1; and FIG. 3 is an exploded perspective view showing one manner of assembling the principal elements of a typical seal constructed according to the invention.

Figure 1:
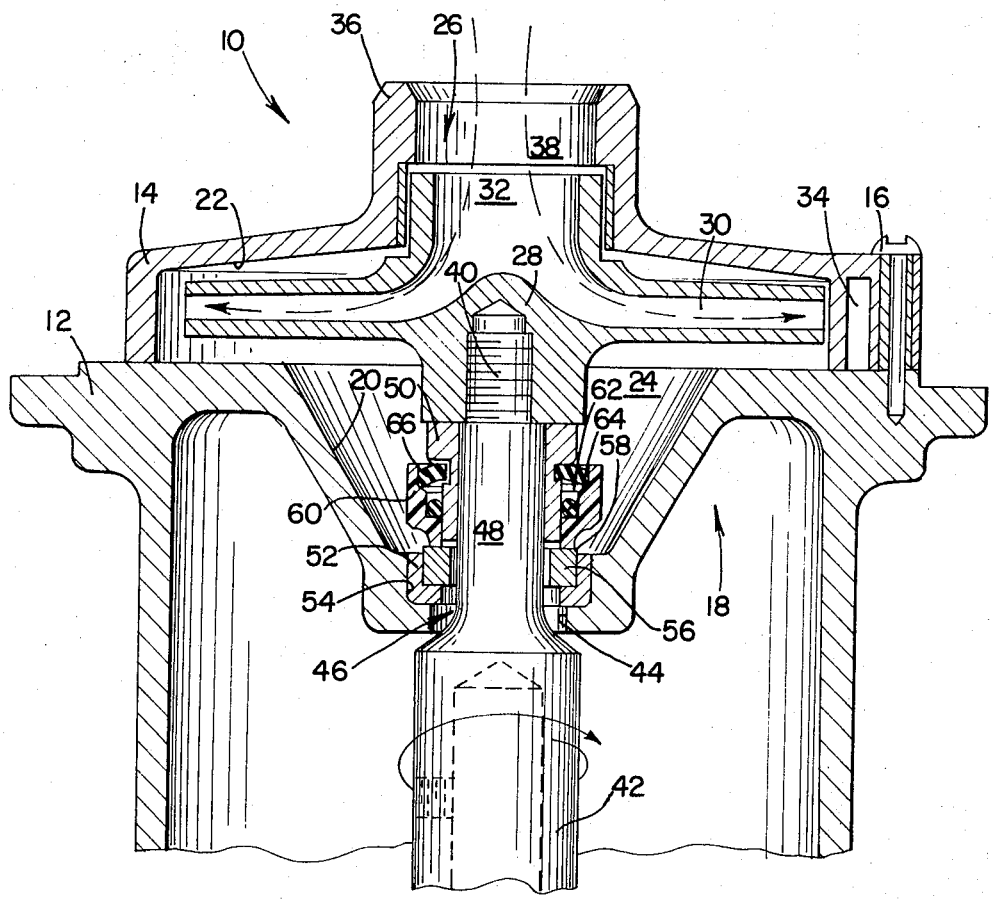
FIG. 1 is a vertical sectional view showing a fluid pump or the like having a housing and an impeller disposed on a rotatable shaft and showing one form of the seal unit of the invention providing a fluid type seal between the interior of the pump housing and the atmosphere.

DESCRIPTION OF THE PREFERRED
EMBODIMENTS OF THE INVENTION

Before referring in detail to the drawings, it will be understood that, as used herein, the term "end face seal" refers to a construction wherein a fluid tight seal is formed between relatively movable axially facing, radially extending members along an annular contact path sometimes referred to as a seal band. It will also be understood that the expression "primary seal" refers to the seal between rotatable or otherwise movable elements and that the expression "secondary seal" refers to a seal between parts which are not normally movable or intended to be movable with respect to each other. Normally, only a single primary seal is present in any given construction, although it is not uncommon for plural secondary seals to be required. Furthermore, it will be understood that while seals of the invention are advantageously used in fluid pumps, they may also be put to a great variety of other uses.

Referring now to the drawings in greater detail, FIG. 1 shows a pump unit 10 having a body portion 12 and a cover 14 secured to the body 12 by fasteners 16 with the body 12 and cover 14 forming a housing generally designated 18. The inner wall portions 20, 22 of the body and cover 12, 14 respectively define an interior cavity 24, in which an impeller unit 26 is disposed. The impeller 26 includes a hub 28 and a plurality of radially directed passages 30 extending outwardly from the central impeller inlet opening 32. The interior walls 22 of the cover 14 are of a well known scroll configuration and include a generally tangentially extending outlet passage 34 through which fluid is forced to flow by centrifugal force upon high speed rotation of the impeller 26. The nose portion 36 of the pump 10 includes an inlet area 38 for receiving water or other fluid, it being understood that the nose 36 might typically be surrounded by a hose (not shown) through which fluid would be supplied to the pump inlet area 38.

As shown in FIG. 1, the hub 28 of the impeller 26 is fastened by a threaded boss 40 on the end of a rotatable shaft 42. The pump body 23 includes an annular wall 44 defining a bore 46 through which a reduced diameter portion 48 of the shaft 42 extends. A core unit 50 is press fit in fluid-tight relationship over the reduced diameter portion 48 of the shaft 42, a gasket or packing element 52 is disposed within a counterbore 54 in the body 12, the counterbore 54 being of increased diameter in relation to the bore 46. The packing element 52 served to retain a stationary mating ring 56 in a predetermined position within the housing 12, and the mating ring 56 includes a radially extending, axially directed primary seal face 58.

Disposed over the core 50 is an annular primary sealing element 60. Lying within the annular region 62 inside the seal element 60 are secondary seal means in the form of an O-ring 64 and a single elastomeric multifunction unit in the form of a Belleville washer 66.

FIG. 2 shows that the Belleville washer 66 is fitted within an annular groove 68 in the core 50, and that the radially outermost, axially extending surface 70 of the Belleville washer 66 engages an oppositely directed inner face 72 of the sealing element 60. An important feature of the invention, to which further reference will be made herein, is the provision of the small, axially extending vent 74 in the groove 68. A reduced diameter inner surface 76 of the seal element 60 defines inwardly thereof an annular recess 78 and is sized so as to place a slight radial compressive load on the O-ring 64 so that the same is maintained in snug secondary sealing engagement with the outer surface 80 of the core 50. FIG. 2 also shows that the primary seal area 82 is formed by engagement between a radially extending, axially directed sealing face 84 on the nose portion 86 of the seal element 60 and the sealing face 58 on the mating ring 56.

forms a seal between the shaft or a part associated therewith and the primary sealing element.

Referring now to the preferred construction of the seal assembly of the invention, it will be understood that various components of the seal unit may be made from a number of materials, many of which are well known to those skilled in the fluid seal art. For example, in a typical embodiment of the invention, the Belleville washer element 66 is a stiff but resilient elastomer such as a nitrile rubber or other synthetic rubber. Desirable characteristics for this element 66 include good compression set characteristics and chemical inertness in respect to the fluids being handled. The O-ring unit 64 is also preferably a synthetic rubber of similar composition and characteristics. Preferably, the core unit 50 is molded or machined from a thermoplastic material or machined from metal, although the core may also be made from a metal stamping or a plastic drawing. Preferred materials for the core include "Delrin" acetal plastic, polyethylene, or other materials. The sealing face, and ordinarily the sealing element itself is made from an inert material such as a phenolin or other thermosetting plastic or a carbon-graphite material. Other suitable seal materials are well known to those skilled in the art. The mating ring is typically constructed of a ceramic or other relatively inert material, and both opposite faces 58, 84 of the mating ring 56 and the sealing element 60 are ground and precision lapped prior to installation so as to present smooth, fluid-tight surfaces to each other. In addition to the chemical resistance provided by the rubber material from which the element 66 is formed, an additional degree of chemical resistance in use is available by reason of the thick cross-section of the element 66. This is in contrast to prior art seals using rubber diaphragms or the like which, commonly being about 0.015 inches in thickness, are subject to early failure upon even the slightest chemical penetration. The thick cross-section of the element 66 provides good performance of its function in use even if portions thereof are attached slightly by chemicals. The packing element 52 is also customarily made of a rubber or like material having the same characteristics as the other rubber elements referred to above. However, the secondary seal afforded by this element may be provided by other means, such as by an adhesive, an O-ring or the like.

It will thus be seen that the present invention provides an improved end face seal assembly having a number of advantages and characteristics, including those herein pointed out and others which are inherent in the invention.

I CLAIM:

1. A seal unit for establishing a fluid-tight seal between first and second elements having portions thereof lying in an area of elevated pressure to prevent fluid leakage to a reduced pressure area, said elements being movable relative to each other, said unit comprising, in combination, means associated with said first element and axially fixed in relation thereto, an axially movable sealing element having a radially extending, axially directed sealing surface thereon adapted to engage an oppositely disposed mating surface associated with said second element in cooperative relation therewith to form a primary seal, single elastomeric means extending generally radially between said associated means and said sealing element, said single means biasing said axially movable sealing element into a predetermined axial position and operatively securing said associated means to said sealing element for preventing intentional relative rotation therebetween, means for equalizing fluid pressure on both axial sides of said single means, and secondary seal means lying between said associated means and said sealing element and forming a fluid-tight seal between said pressure areas.

2. A seal unit as defined in claim 1 wherein said associated means comprises a generally cylindrical seal core unit adapted to be received over a portion of a rotatable shaft.

3. A seal unit as defined in claim 1 wherein said axially movable sealing element is in the form of a generally cylindrical member having a first inwardly facing wall portion defining an internal opening of a given diameter, and a second wall portion axially spaced from said first wall portion and defining a second internal opening of reduced diameter relative to said first opening.

4. A seal unit as defined in claim 1, wherein said single elastomeric means is in the form of a sealing ring of generally frusto-conical cross-section, said ring including inner and outer mounting surfaces, said frusto-conical shape causing said outer mounting surfaces to lie in an at least somewhat axially offset position in relation to said inner surface.

5. A seal unit as defined in claim 1 wherein said means for equalizing fluid pressure comprises a vent passage in said associated means.

6. A seal unit as defined in claim 1 in which said secondary seal means is in the form of a O-ring.

7. A seal unit as defined in claim 2 wherein said generally cylindrical seal core unit includes a vented annular groove therein for snugly receiving the inner surface portions of said single means, whereby said single means may be located axially and whereby said vent provides said means for equalizing said pressure while maintaining a snug fit between said groove and said inner surface portions of said single means.

8. A seal unit as defined in claim 3 wherein said single means extends between said first inwardly facing wall portion and said associated means in fluid permeable relation, and wherein said secondary seal means extends between said second wall portion and said associated means in fluid-tight relation.

9. A seal unit as defined in claim 1 wherein said first element and said means associated therewith are rotatable and wherein said second element and the mating surface associated therewith are fixed.

10. A fluid seal unit for establishing a fluid tight seal between first and second elements having portions thereof lying in an area of elevated pressure to prevent fluid leakage therefrom to an area of reduced pressure, said elements being relatively movable to each other, said seal unit comprising, in combination, a seal core element adapted to be fixed against relative axial movement, a generally cylindrical primary sealing element concentrically arranged in relation to said core and including an interior wall defining a central opening through said sealing element, an elastomeric element extending between said core and said primary sealing Referring now to FIG. 3, the primary sealing area 82 is shown to lie between the axially oppositely facing surface 58 of the mating ring 56 and the surface 84 lying on the nose portion 86 of the sealing element 60.

Referring now to FIG. 3, and to a typical method of assembling the seal unit of the invention, the threaded nose 40 of the shaft 42 is aligned with the hub 28 of the impeller 26, and the packing element or gasket 52 (FIGS. 1 and 2) is placed in the counterbore 54. Thus, the mating ring 56 is placed in a predetermined axial and radial location. Thereafter, the O-ring 64 is positioned inside the surface 76, the Belleville washer 66 is placed within the groove 68, the core 50 having previously been tightly press fit over the reduced diameter portion 48 of the shaft 42. In the illustrated embodiment, the the shoulder 88 of the hub 28 engages an end face 90 of the core 50, thereby positioning the core 50 in the desired axial position.

Although the opposite end face 92 of the core 50 is spaced apart from the primary seal surface 58 on the mating ring 56, the seal surface 84 is urged into tight sealing relation therewith. In use, the mounted Belleville washer 68, which is of relatively thick, frustoconical cross-section, as shown, exerts an axial preload directed toward the mating ring 56, that is, downwardly as shown in FIGS. 1 and 2. It will be understood, however, that in practice, it is typical for the shaft 42 to lie horizontally, and that the drawings show a vertical layout merely for purposes of illustration. By reason of the Belleville washer or frusto-conical shape of the element 66, forces tending to urge the seal element 60 in an axial direction, if resisted, increase the radial compressive load directed inwardly of the groove 68. Accordingly, when properly dimensioned, the element 66 has sufficient radial compressive load to fit tightly into the groove 68 and to direct a radially outward force through surface 70 onto the inward surface 72 of the sealing element 60. These forces are sufficient to permit the core 50 to drive the seal element 60 under all conditions reasonably expected to be encountered. However, relative motion between the elements 50, 60 is not necessarily harmful in itself. The stiffness and dimensions of the washer element 66 therefore determines the axial load applied to the sealing element 60. In use, referring again to FIG. 1, and assuming that the interior 24 is filled with water of a pressure up to about 60 to 100 pounds per square inch, the forces thereby generated would normally act against the outer generally radially extending surface 94 of the multipurpose washer element 66, and urge it and its operationally associated element 60 to a position toward the bottom as shown in FIGS. 1 and 2. With sufficiently high pressures, the washer 66 would ultimately collapse into the region 96 between the core 50 and the seal element 60. This would then, or even prior thereto, cause secondary leakage through the groove 68 and/or between surfaces 70, 72. Thereupon, the fluid would be free to leak between the outer surface 98 of the core 50 and the inner surface 80 of the sealing element 60, inasmuch as these parts are not tightly fitted and they must be sized so as to permit relative axially movement therebetween.

However, the presence of vent 64 permits fluid under pressure to fill the area 96, thereby equalizing the pressure across the Belleville washer 66. However, any tendency of fluid to leak from area 96 between the surfaces 80, 98 is prevented by the provision of the O-ring 64. In this connection, it will be realized that the O-ring is of greatly reduced cross-sectional area in relation to the area of the radial face 94 of the washer element 66. Furthermore, O-rings such as the ring 64 are known to provide excellent high pressure sealing characteristics. By reason of the construction of the element 60 and the core 50, the O-ring 64, while fitting snugly enough to provide an excellent high pressure seal, does not provide substantial resistance to axial movement of the element 60, nor does it provide an appreciable increase in axial force by reason of fluid pressure in the region 96. However, the O-ring 64 is able partially to perform the function of transmitting torque from the core 50 to the sealing element 60 and, in this sense, assists the washer element 66 in performing its function.

Seals made as illustrated have been characterized by extended longevity in use, and have demonstrated excellent primary and secondary sealing characteristics, including the capability to seal pressures of 50 to 100 p.s.i. or more. In this respect, seals made according to the invention are capable of sealing from about five up to about ten times or more pressures than that able to be sealed by their counterparts wherein a pressure differential existed across the Belleville washer element. Seals of this kind are in all other functional respects the equivalent of their counterparts made without the vent 74 and the O-ring 64. Furthermore, the novel seal is simple to assemble and manufacture and is inexpensive relative to other seals having the same capability. In the construction illustrated, the core unit 50 is separately formed from a portion 48 of the shaft 42 and is pressed thereover in a fluid-tight fit. It will be understood, however, that the core element 50 need not be separately made for the proper practice of the invention. Likewise, it will be understood that it is within the scope of the invention to provide a construction wherein the parts herein shown to be fixed are mounted for rotation and vice versa. It is also understood that the vent 74 might be situated elsewhere provided that it performs the function of permitting fluid pressure to be equal within the interior 24 of the pump and the area 96 lying inside the washer element 66. Likewise, it is also possible to replace the mating ring 56 by a seal assembly which is a counterpart but mirror image of the assembly which includes the sealing element, the Belleville washer element, the O-ring and a grooved support member.

Since the seal unit of the invention may take a number of different forms, the position of the secondary seal unit, although ordinarily lying axially of the Belleville washer in the direction of the primary sealing face, need not always be so arranged. Accordingly, it may be thought of as lying downstream of the Belleville washer in the reference to the direction that leakage would take place were it not for the presence of the secondary seal. Accordingly, the secondary seal, such as the O-ring, would customarily be in facing relation to that face of the Belleville washer which would be the low pressure side thereof in the absence of any vent means. Accordingly, the arrangement may be generically spoken of as one wherein there is no appreciable pressure drop across the Belleville washer and wherein the secondary seal is downstream of the washer and element and presenting substantially imperforate surfaces toward each axial end of said seal unit and extending continuously between said seal element and said core, secondary seal means disposed between said core and said primary sealing element for creating a high pressure fluid-tight seal therebetween and for permitting relative axial movement therebetween, and vent means providing fluid communication between the region lying outwardly of the outer of said surfaces and the region adjacent said secondary seal means and lying between said core and said sealing means.

11. A seal unit as defined in claim 10 wherein said elastomeric element is of generally frusto-conical cross-section.

12. A seal unit as defined in claim 10 wherein radially offset, generally annular grooves are provided, respectively, in said core unit and said primary sealing element, said grooves being at least slightly axially offset from each other in the assembled position of use of said seal.

13. A seal unit as defined in claim 10 in which said secondary seal means is in the form of an O-ring.

14. A seal unit as defined in claim 10 wherein said secondary seal means is of greatly reduced cross-sectional area in relation to the cross-sectional area of said elastomeric element when said elements are viewed axially of said seal unit.

* * * * *